(12) United States Patent
Homner

(10) Patent No.: US 7,950,889 B2
(45) Date of Patent: May 31, 2011

(54) CONNECTION ARRANGEMENT FOR SUPERIMPOSED LAYERS OF MATERIAL

(75) Inventor: Bernhard Homner, Calw-Stammheim (DE)

(73) Assignee: S—Fasteners GmbH, Magstadt (DE)

( * ) Notice: Subject to any disclaimer, the term of this patent is extended or adjusted under 35 U.S.C. 154(b) by 0 days.

(21) Appl. No.: 12/478,490

(22) Filed: Jun. 4, 2009

(65) Prior Publication Data
US 2009/0238660 A1 Sep. 24, 2009

Related U.S. Application Data

(62) Division of application No. 11/636,180, filed on Dec. 9, 2006, now Pat. No. 7,658,583.

(30) Foreign Application Priority Data

Dec. 27, 2005 (DE) .................. 20 2005 020 309 U

(51) Int. Cl.
*F16B 19/00* (2006.01)
(52) U.S. Cl. ........................................ 411/510; 411/903
(58) Field of Classification Search .................. 411/510, 411/903, 908, 508, 809, 902, 913; 40/27, 40/299.1, 300–303
See application file for complete search history.

(56) References Cited

U.S. PATENT DOCUMENTS

| 309,181 A | 12/1884 | Woodrich |
| 1,093,637 A | 4/1914 | Lint |
| 2,896,897 A * | 7/1959 | Schlueter ...................... 248/239 |
| 3,266,831 A | 8/1966 | Banse |
| 3,571,977 A | 3/1971 | Abeel |
| 3,687,493 A * | 8/1972 | Lock et al. ..................... 285/333 |
| 4,003,175 A * | 1/1977 | Patry ........................... 52/506.05 |
| 4,495,380 A * | 1/1985 | Ryan et al. ................. 174/138 D |
| 4,610,330 A * | 9/1986 | Borst ............................... 182/90 |
| 4,686,783 A | 8/1987 | Bourquard |
| 4,805,366 A | 2/1989 | Long |
| 4,987,714 A * | 1/1991 | Lemke ............................ 52/410 |
| 5,036,674 A | 8/1991 | Chang |
| 5,217,339 A | 6/1993 | O'Connor |

(Continued)

FOREIGN PATENT DOCUMENTS

DE 1860948 U 10/1962

(Continued)

OTHER PUBLICATIONS

European Patent Application Serial # 07024365, European Search Report, Jun. 13, 2008, Homner, Entire Document.

(Continued)

*Primary Examiner* — Gary Estremsky
(74) *Attorney, Agent, or Firm* — Woodling, Krost and Rust

(57) ABSTRACT

In aircraft construction, connection elements for connecting layers of insulating material onto walls are subject to special requirements for ease of installation, weight considerations, and resistance to heat. The invention provides a connection arrangement, in particular for superimposed layers of material, whose function is not impaired under extreme heat. The connection arrangement is comprised by a pin with a head or head arrangement, engaging positions, and a retaining element. The pin, the head or the head arrangement, and retaining element are made up of a skeleton and an outer material where the skeleton is made of a material more resistant to heat than the outer material. Following destruction or removal of the outer material by heat, the remaining skeleton parts of the pin, head part, and retaining element maintain their connections and structure keeping the layers of material in place.

3 Claims, 8 Drawing Sheets

U.S. PATENT DOCUMENTS

| Number | Date | Name |
|---|---|---|
| 5,308,205 A | 5/1994 | Lautenschlager |
| 5,426,905 A | 6/1995 | Rollhauser |
| 5,529,369 A | 6/1996 | Welborn |
| 5,626,450 A | 5/1997 | Ferrari et al. |
| 5,655,801 A | 8/1997 | Casey |
| 5,782,511 A | 7/1998 | Schwarz |
| 6,149,210 A | 11/2000 | Hunt |
| 6,379,092 B1 * | 4/2002 | Patel et al. .................. 411/61 |
| 6,381,811 B2 | 5/2002 | Smith et al. |
| 6,409,446 B1 | 6/2002 | Schwarz |
| 6,442,806 B1 | 9/2002 | Wesson |
| 6,443,679 B1 | 9/2002 | Schwarz |
| 6,497,436 B1 | 12/2002 | DeBlock |
| 6,679,530 B2 | 1/2004 | Krynski |
| 6,726,418 B2 * | 4/2004 | Dickinson et al. ............ 411/182 |
| 6,736,438 B1 | 5/2004 | Wieclawski |
| 6,837,661 B2 | 1/2005 | Schwarz et al. |
| 6,846,125 B2 * | 1/2005 | Smith et al. .................. 403/291 |
| 6,866,227 B2 | 3/2005 | Pratt |
| 6,908,144 B2 | 6/2005 | Gotzinger et al. |
| 7,107,697 B2 | 9/2006 | Schwarz et al. |
| 7,179,039 B2 | 2/2007 | Schwartz et al. |
| 7,234,209 B2 | 6/2007 | Totani et al. |
| 7,524,131 B2 | 4/2009 | Schwarz et al. |
| 7,533,911 B2 | 5/2009 | Homner |
| 2004/0115030 A1 | 6/2004 | Schwarz |
| 2007/0147975 A1 | 6/2007 | Homner |
| 2008/0150301 A1 | 6/2008 | Homner |
| 2008/0157543 A1 | 7/2008 | Homner |
| 2008/0273922 A1 | 11/2008 | Homner |

FOREIGN PATENT DOCUMENTS

| Country | Number | Date |
|---|---|---|
| DE | 3145155 A1 | 11/1981 |
| DE | 8710288 U1 | 10/1987 |
| DE | 3623311 A1 | 1/1988 |
| DE | 3922025 C1 | 9/1990 |
| DE | 4239908 C1 | 3/1994 |
| DE | 19707634 A1 | 10/1997 |
| DE | 29808914 U1 | 9/1998 |
| DE | 29914145 U1 | 12/2000 |
| DE | 19943083 A1 | 12/2001 |
| DE | 20218302 U1 | 3/2003 |
| DE | 10355780 A1 | 6/2005 |
| DE | 102004011183 A1 | 9/2005 |
| DE | 102006008655 A1 | 9/2006 |
| DE | 10040410 A1 | 1/2007 |
| DE | 202007000112.6 | 8/2007 |
| DE | 2020006019165.8 | 8/2007 |
| EP | 0189569 B1 | 2/1989 |
| EP | 0784141 A1 | 7/1997 |
| EP | 1834871 | 9/2007 |
| EP | 1803867 | 8/2008 |
| GB | 1268022 | 3/1972 |
| GB | 1506902 | 4/1978 |
| GB | 2050487 A | 1/1981 |
| GB | 2219342 A | 12/1989 |
| JP | 2000310210 A | 7/2000 |
| WO | 80/00162 A1 | 2/1980 |

OTHER PUBLICATIONS

European Patent Application Serial # 07024364, European Search Report, Jun. 13, 2008, Homner, Entire Document.

European Patent Application Serial # 06026133, European Search Report, Mar. 23, 2007, Homner, Entire Documnt.

European Patent Application Serial # 07004742, European Search Report, May 20, 2007, Homner, Entire Document.

* cited by examiner

CONNECTION ARRANGEMENT FOR SUPERIMPOSED LAYERS OF MATERIAL

This application is a Divisional Patent Application of U.S. patent application Ser. No. 11/636,180 filed Dec. 9, 2006 now U.S. Pat. No. 7,658,583 and claims the benefit of, and priority to, that application and its filing date.

The invention refers to a connection arrangement especially for superimposed layers of material. In many cases, walls (for example) are fitted with layers of insulating material on one or both sides. There are different means of fixing these in position, e.g. the insulating layers can be bonded with adhesive or attached by means of pins or screws. In aircraft construction connection elements of this kind are subject to special requirements e.g. with regard to ease of installation, weight and resistance to heat. Connection elements of plastic do not fulfil such high requirements of heat resistance because plastic either melts or burns when subjected to heat.

In order to avoid this disadvantage, the purpose of the invention is to provide a connection arrangement, in particular for superimposed layers of material, whose function is not impaired under extreme heat, even when the plastic melts or burns.

This purpose of the invention is fulfilled by the properties stated in the characterising section of the claims 1, 2, 15 and 16. Advantageous modifications of the invention are described in the sub-claims.

Adaptations of the invention are shown in the drawings and are described in more detail below.

FIG. 1A

A diagram of the connection arrangement according to invention for two layers of material, consisting of a suitably shaped pin with head and a retaining disk which can be connected in an engaging position to the end of the pin.

FIG. 1B

A perspective view of the pin according to invention as in FIG. 1A.

FIG. 1C

A section view of the pin according to FIG. 1B, section plane E, direction of view A.

FIG. 2A

A section view of three material layers and a connection arrangement according to invention consisting of a suitably shaped pin, each of whose ends can be connected to a retaining disk.

FIG. 2B

A perspective view of the pin according to FIG. 3A.

FIG. 2C

A perspective view of the metal skeleton of the pin according to FIG. 3A.

FIG. 3A

A perspective view of the connection arrangement according to invention with an arrangement of its head part which may be used for attaching, holding or storing of objects or components.

FIG. 3B

A perspective view of the metal skeleton of the pin and the head-part arrangement.

FIG. 4A

A perspective view of the retaining disk of the connection arrangement according to invention.

FIG. 4B

A perspective view of the metal skeleton of the retaining disk according to FIG. 4A.

FIG. 1A shows a diagram of the connection arrangement according to invention for two layers of material A and B, consisting of a suitably shaped pin 1 with head 2 and a retaining disk 3 which can be connected in an engaging position s1, s2, s3, s4 (see FIG. 1B) to the end of the pin.

FIG. 1B shows a perspective view of the pin according to invention as in FIG. 1A and FIG. 1C a section view of the pin 1 according to section plane E, direction of view A in FIG. 1B.

The pin passes through a hole in the material layer B and is simply pressed through the "softer" layer of insulating material A.

As shown in FIG. 1B and FIG. 1C, pin 1 has concentrically groove-shaped engaging positions s1, s2, s3 and s4 for receiving a retaining disk 3 which is described in more detail for FIG. 4A and 4B.

The retaining disk 3 is pushed onto the pin 1 until it -locks into one of the engaging positions. The two superimposed layers of material A, B are arranged between the head 2 of pin 1 and the retaining disk. If the pin, head and retaining disk were only made of plastic, which melts or burns in extreme heat, the layers of material would no longer be joined in case of fire. For this reason, the pin 1, head 2 and retaining disk 3 according to invention have a metal skeleton SK1, SK2 and SK3, which, in special design, is coated with plastic 4. Should the plastic be destroyed by heat, the cooperating skeleton parts maintain the connection between the material layers A and B. These remain located on the pin skeleton SK1 between the head skeleton SK2 and the retaining-disk skeleton SK3.

The pin skeleton SK1 and the head skeleton SK2 (see FIG. 1C) can be manufactured as one flat stamping. The pin skeleton has a continuous skeleton shaft with rungs C1, C2; C3, C4; C5, C6; C7, C8 which project laterally directly opposite one another. The engaging positions s1, s2, s3 and s4 are formed between the ends of the rungs (see FIG. 1B and 1C).

In lengthwise section (FIG. 1C) pin 1 has an outer contour similar to a saw tooth. The engaging positions are formed by the gaps between the teeth which may have a horizontal bottom. The outer "saw-tooth" contour is formed by tooth flanks (as) rising in direction of the head 2 and tooth flanks (de) falling towards the axis of the pin (preferably vertically).

Head 2 and retaining disk 3 do not have to be coated with plastic. However, to facilitate handling (avoidance of sharp edges) and installation (collar edge for retaining disk) coating with plastic may be more favourable.

FIG. 2A, 2B and 2C refer to a specially shaped pin 1' for holding three layers of material C, D and E together.

The material layers C and E may be, for example, of material through which the pin can easily be pushed, as is the case with "soft" damping or insulating boards. In material D, which cannot be penetrated so easily by the pin, a hole should be provided through which the pin can pass.

FIG. 2A shows a section view of three material layers C, D and E placed on top of or against one another. These are held together by a pin 1', at whose ends engaging positions are formed for receiving one retaining disk 3 each. The pin and the retaining disks contain metallic skeleton elements which are coated with plastic.

FIG. 2B shows a perspective view of the pin 1' and

FIG. 2C a perspective view of the metal skeleton of the pin SK1'.

Layers of softer material C and E are located on either side of the harder layer of material D.

At both its ends, the pin 1' has concentrically arranged groove-shaped engaging positions s1', s2', s3', s4' and s5', s6', s7' with a saw-tooth shaped outer contour in an imaginary sectional view.

The outer "saw-tooth" contour is formed by tooth flanks (as') rising in direction of the flange F' and tooth flanks (de') falling towards the axis of the pin (preferably vertically).

The flange F' divides the pin into two parts x and y. Details of the retaining disks 3 at both ends of the pin are given in connection with FIG. 4A and FIG. 4B. The layer of stronger material D is located to the right of the flange F'. It is held in position by a supporting element H' projecting obliquely from the pin.

All three layers of material, C, D and E, are held together by the retaining disks 3 which are pushed from the ends of the pin into the corresponding engaging positions.

The pin 1' comprises a pin skeleton SK1' of metal (preferably steel) consisting of a main shaft with rungs C1', C2'; C3', C4'; C5', C6'; C7', C8' and C9', C10', C11', C12', C13', C14' projecting laterally at equal intervals. The engaging positions s1', s2' etc. are formed between the ends of the rungs in pin 1' (see FIG. 2B). The pin skeleton is preferably a flat stamping. It is coated with plastic to form the shape shown in FIG. 2B either by moulding or injection moulding.

By comparing FIG. 2C with FIG. 2B (or FIG. 1B with FIG. 1C) it can be seen that the purpose of the plastic coating of the pin skeleton SK1 is not only to give the skeleton an even surface. The coating takes place in a die and transforms the flat pin skeleton SK1' (SK1) into apin-shaped body with concentric indentations which form the engaging positions.

The plastic coating does not have to cover all the surfaces of the skeleton. Surfaces fa' and fs' at the end of the rungs may remain uncovered in order to ensure that defined engaging positions remain fixed. However, the ability of the connection arrangement to function is maintained when these surfaces fa' and fs' receive only a very thin layer of plastic. The thickness of the layer must be such that the connection of the skeleton parts is retained if the layer is destroyed by fire.

The material layers (not shown for reasons of simplification) are arranged on pin 1" (similar to FIG. 1A) between the head-part arrangement 2" and the retaining disk.

The head-part arrangement 2" may be used for attaching, holding or storing of objects or components and can be shaped in any way.

Figure 1A:
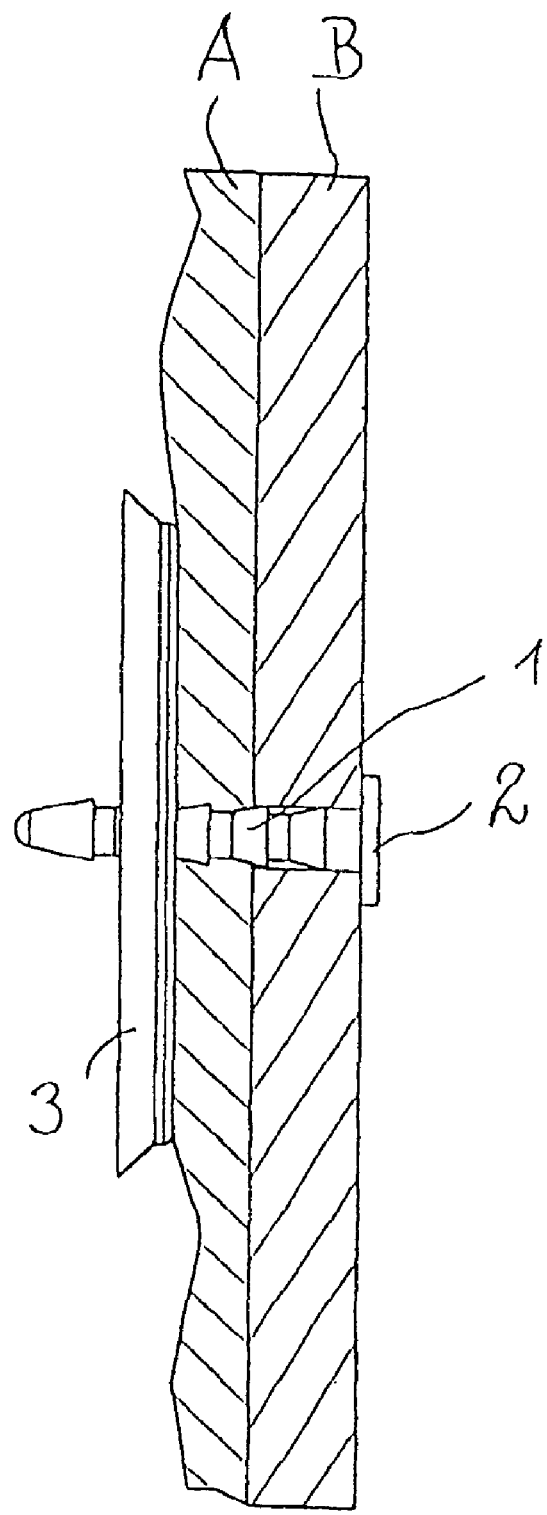
Figure 1B:
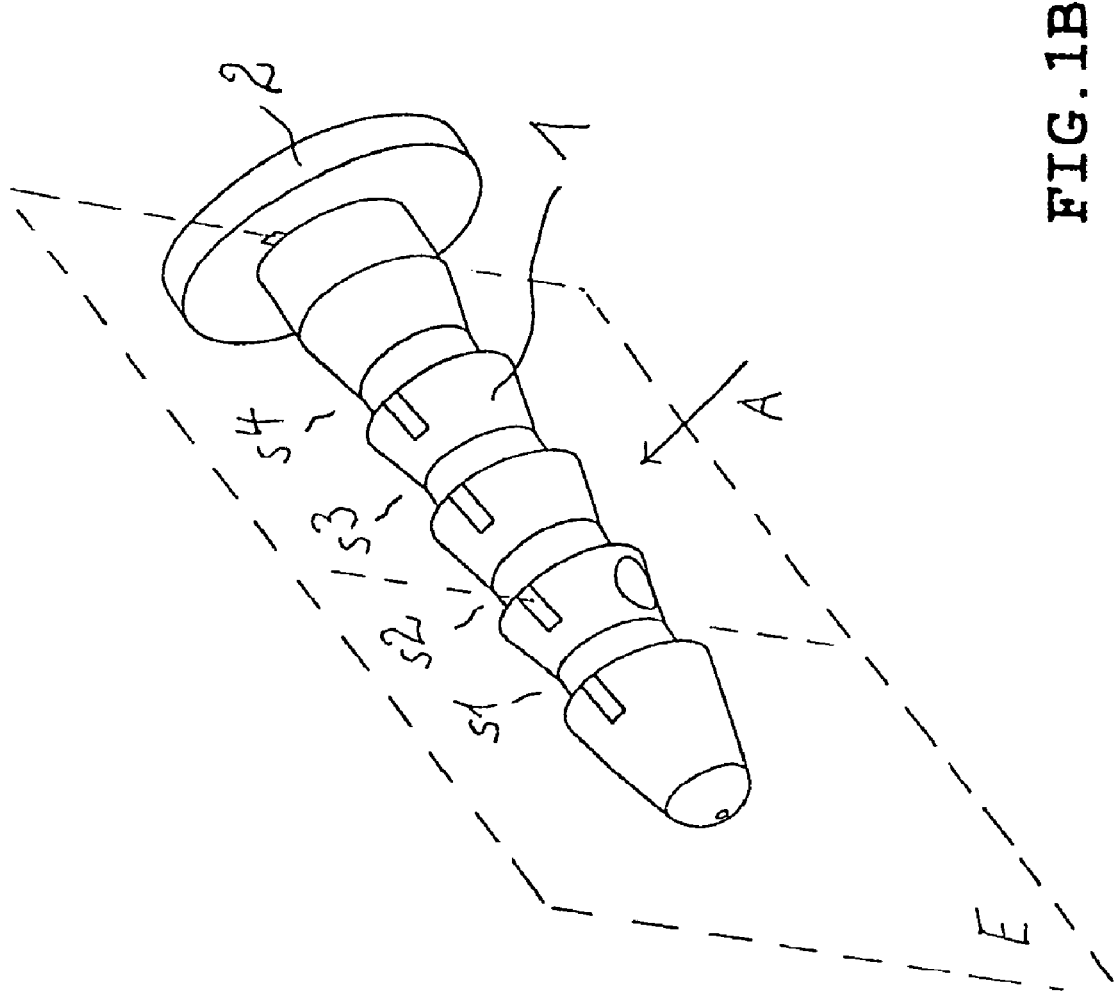
Figure 1C:
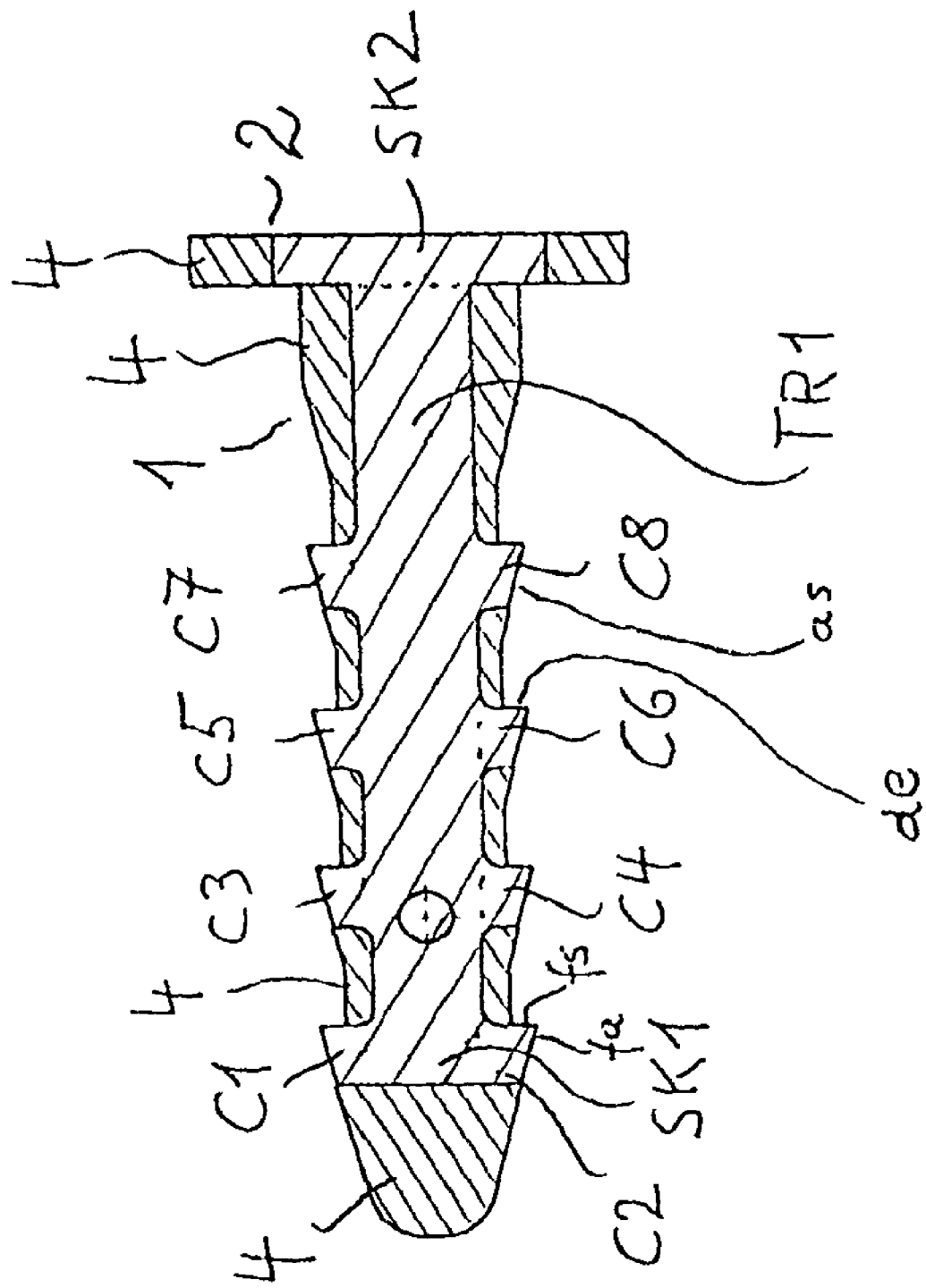

The pin skeleton SK1" is formed similarly to the pin skeleton SK1 in FIG. 1B. Its main shaft TR1" with projecting rungs is connected permanently with the main shaft TR2" of the skeleton SK2" of the head-part arrangement which also has rungs projecting to the side. These serve to stiffen the plastic coating of the head-part arrangement.

Figure 4A:
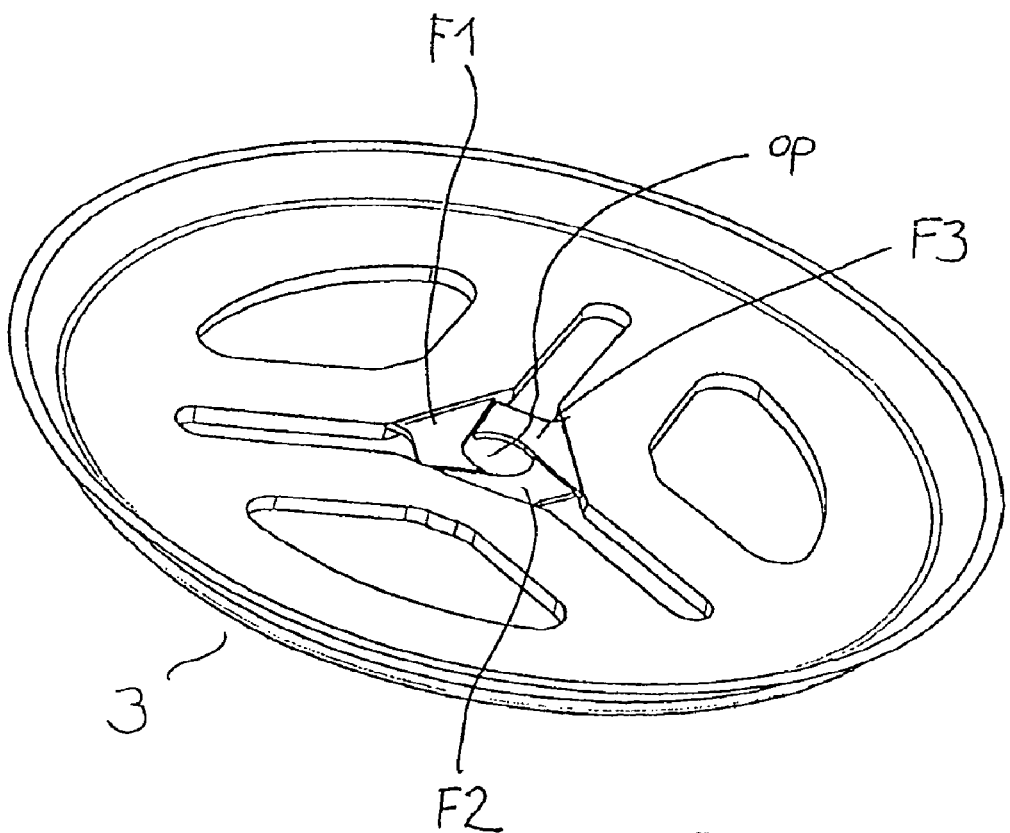

FIG. 4A shows
a perspective view of a retaining disk 3 according to invention with three spring arms F1, F2 and F3 pointing inwards.

Figure 4B:
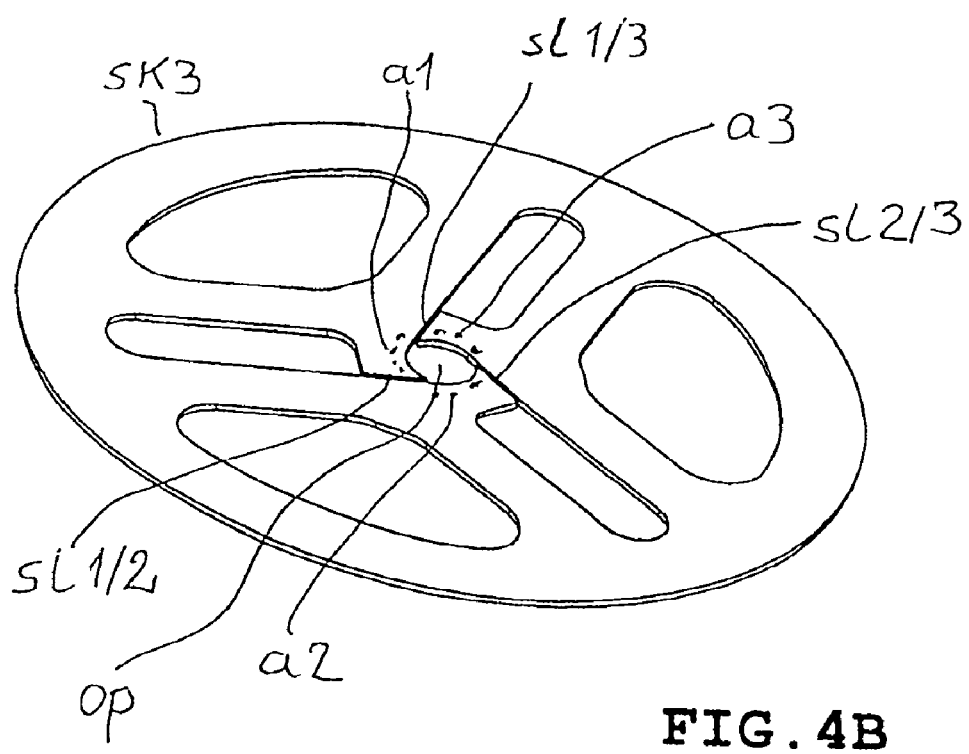

FIG. 4B shows
A perspective view of the metal skeleton SK3 of the retaining disk which is coated with plastic to form the shape shown in FIG. 4A. The skeleton SK3 of the retaining disk is made of spring steel.

The ends of the spring arms embrace, in the form of an arc of a circle (a1, a2 and a3 as indicated by the dotted arcs), an opening (op) through which the imaginary pin 1 (see FIG. 1A) or 1' (see FIG. 2A) or 1" (see FIG. 3A) can be pushed thereby causing the spring arms to yield resiliently.

Figure 2A:
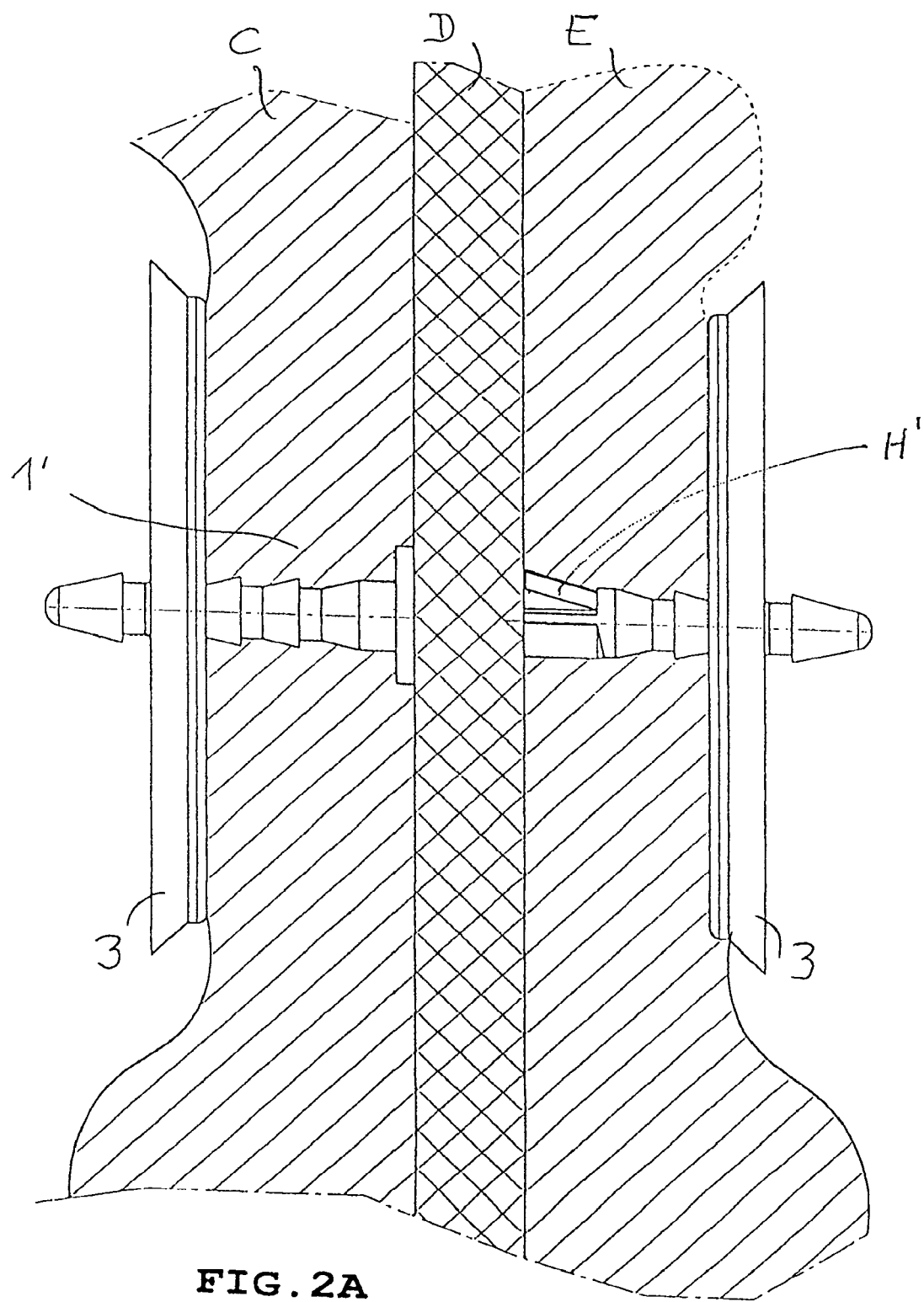
Figure 2B:
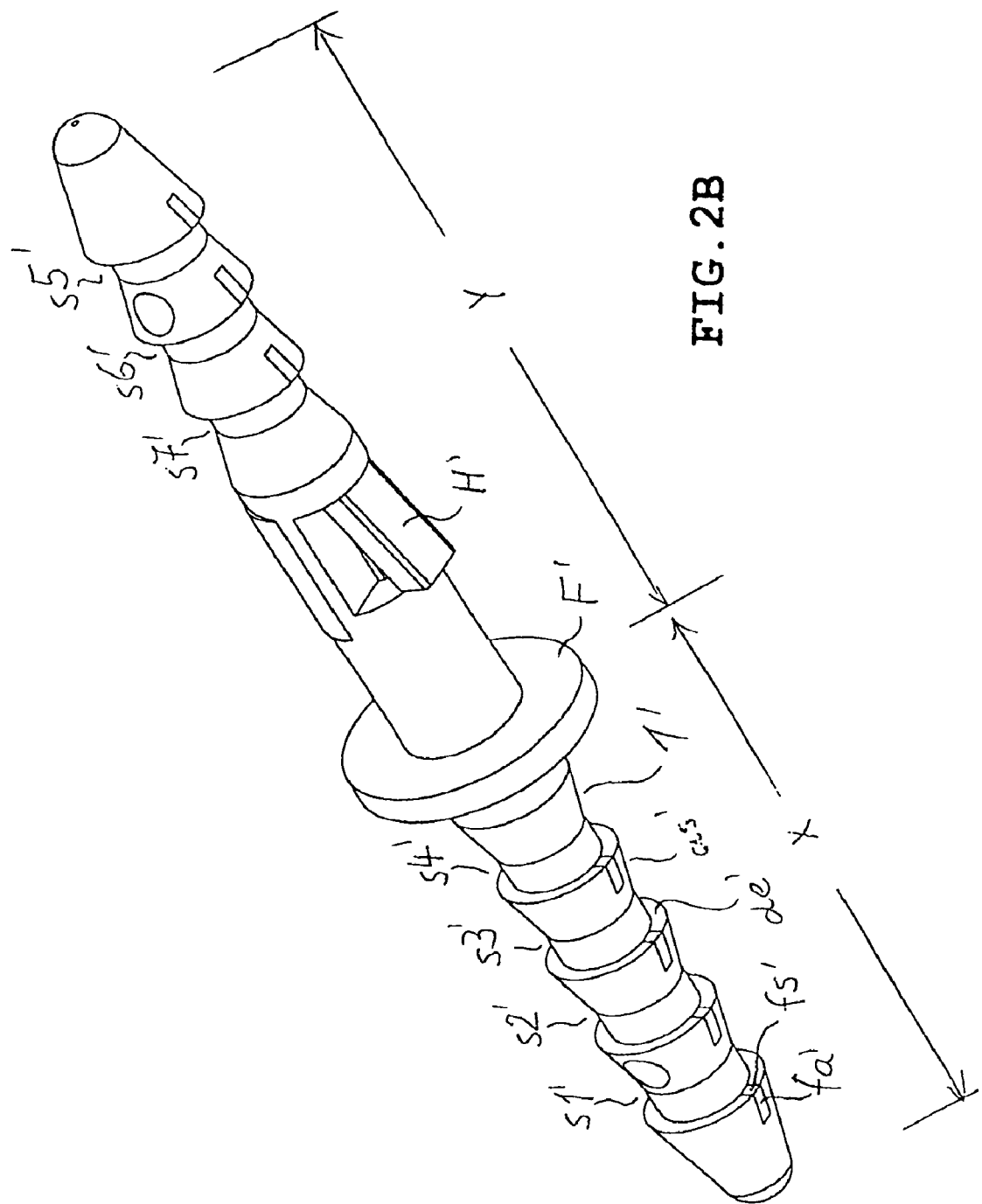
Figure 2C:
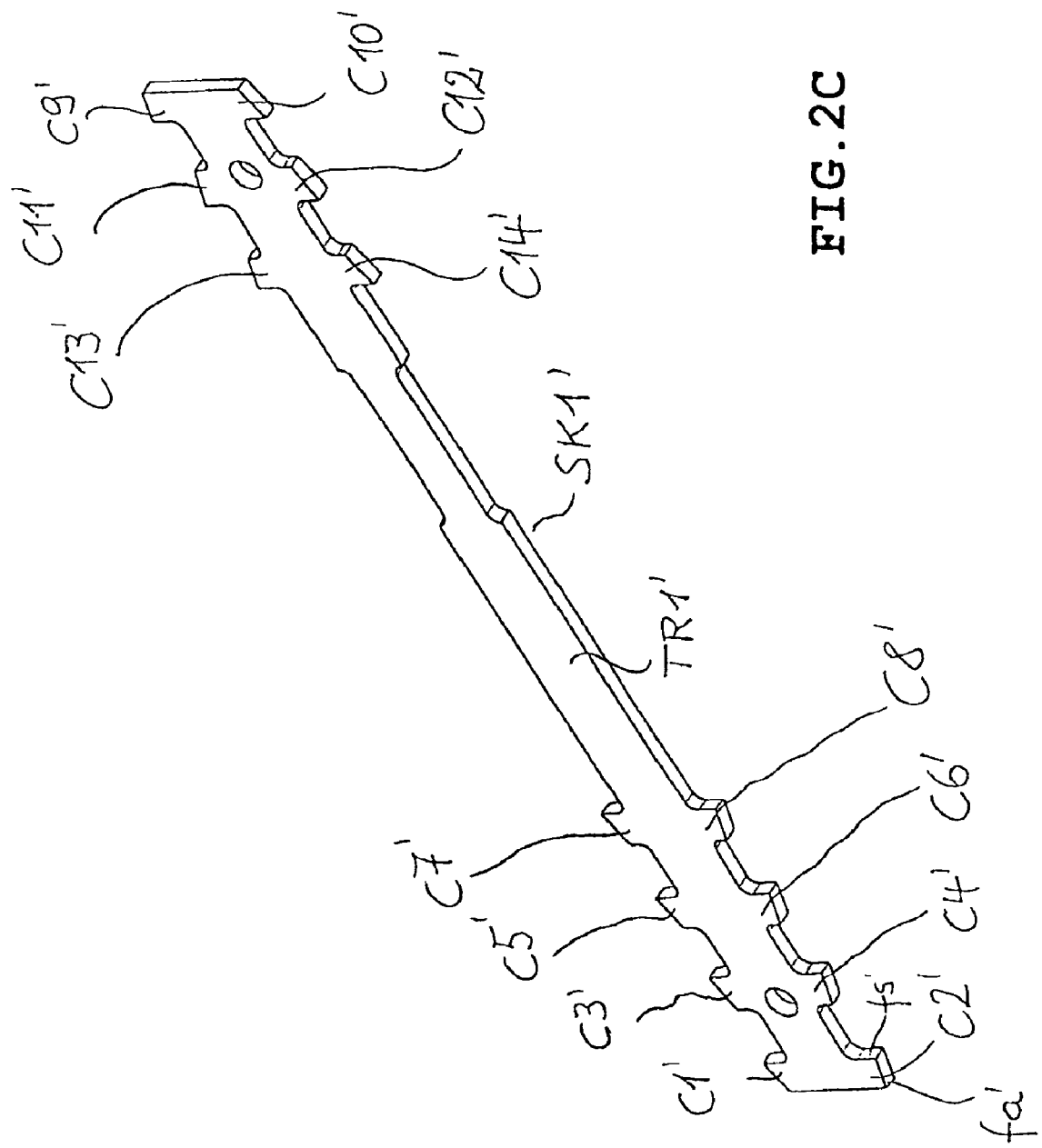

To prevent the pin skeleton SK1, SK1' or SK1" from yielding into the slits s11/2, s12/3 or s13/1 between the spring arms (on destruction by fire of the plastic coating of the assembled arrangement according to FIG. 1A or FIG. 2A) the slits are as narrow as possible i.e. narrower than the thickness of the pin skeleton SK1, SK1' or SK1". They are also aligned in a certain way. In the vicinity of the opening the slits are aligned at a tangent to the opening op.

Should the pin skeleton have an angle profile, the retaining element may have the form of a retaining disk with a straight slit which separates two spring arms pointing towards the slit from one another.

The retaining and connecting arrangement according to invention goes beyond the examples described in connection with the figures. The skeleton parts do not have to be metal and the "plastic" coating does not have to be plastic. It is important that the skeleton material is more resistant to heat than the material surrounding the skeleton. Solutions are also conceivable where the skeleton is of ceramic material and the surrounding material a metal.

However, to meet the demands of aircraft construction, it is sufficient to use steel for the skeleton and plastic (especially polyamide) for the coating.

The invention is not confined to skeletons made of stampings from a flat metal sheet. More complex bodies may also be used as skeletons. Depending on the shape of the engaging positions on the pin, the retaining elements may have a completely different form than that of a retaining disk with spring arms pointing inwards.

Figure 3A:
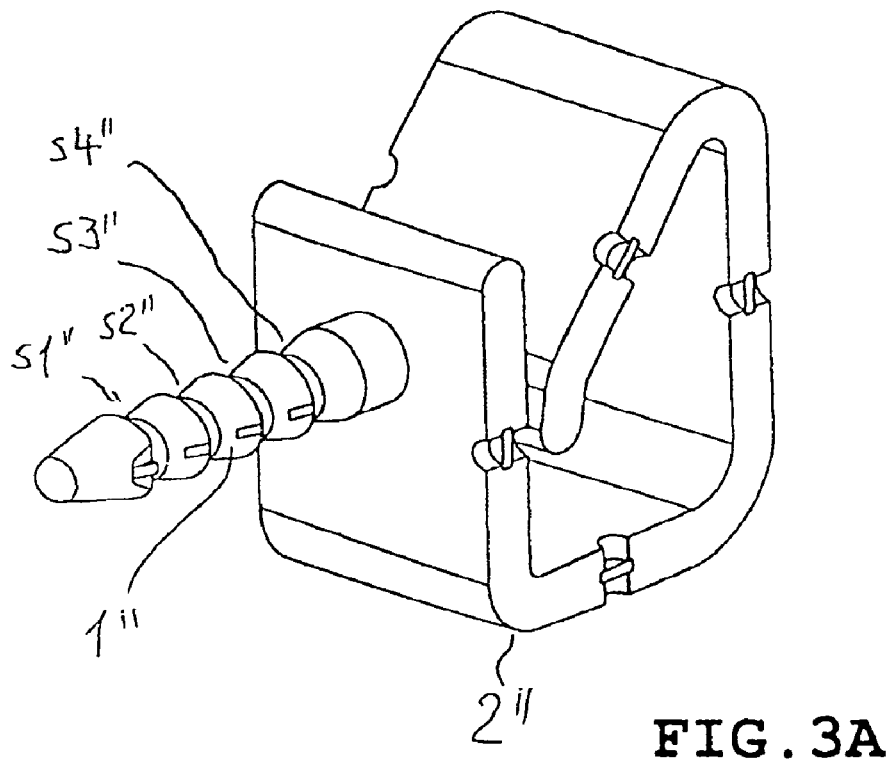
FIG. 3A shows
a perspective view of the connection arrangement according to invention consisting of a pin 1" with a head-part arrangement 2" and a retaining disk (not shown) which can be connected with the end of the pin in an engaging position s1", s2", s3", s4".
Figure 3B:
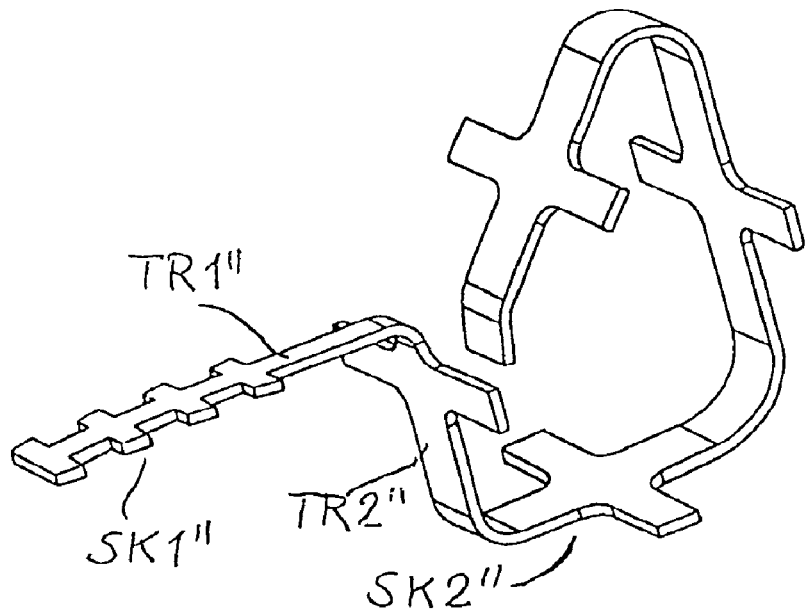
FIG. 3B shows
a perspective view of the metal skeleton SK1" of the pin and the skeleton SK2" of the head-part arrangement.

In addition, the invention is not confined to the head arrangement shown in FIG. 3A and 3B. The pin 1" may be connected to any head arrangement, regardless of its form. It must only be shaped in such a way that it forms a stop for the layer of material lying against it. Similarly, the invention is not confined to holding several layers of material together. It also applies for a single layer of material when (for example) a head arrangement is to be attached to only one layer of material.

The invention claimed is:

1. A pin for a connection arrangement characterised in that:
said pin has a length;
said pin includes engaging positions along part of said length of said pin;
said pin includes a pin skeleton;
said pin is provided with a head;
said head of said pin includes a head skeleton;
said head skeleton of said pin coated with an outer material by molding or infection molding;
said pin skeleton coated with an outer material;
said pin skeleton is more resistant to heat than said outer material of said pin skeleton;
said pin skeleton has a main shaft extending continuously over said length of said pin;
said pin skeleton includes rungs projecting laterally from said main shaft;
said rungs have ends, and, said engaging positions are formed between said ends of said rungs of said pin.

2. The pin for a connection arrangement as claimed in claim 1 wherein said outer material is plastic.

3. A pin for a connection arrangement characterised in that:
said pin has a length;
said pin includes engaging positions along part of said length of said pin;
said pin includes a pin skeleton;
said pin is provided with a head;

said head includes a head skeleton;
said head skeleton coated with an outer material by molding or injection molding;
said head being an attachment;
said pin skeleton coated with an outer material;
said pin skeleton is more resistant to heat than said outer material of said pin skeleton;

said pin skeleton has a main shaft extending continuously over said length of said pin;
said pin skeleton includes rungs projecting laterally from said main shaft;
said rungs have ends, and, said engaging positions are formed between said ends of said rungs of said pin.

* * * * *

UNITED STATES PATENT AND TRADEMARK OFFICE
CERTIFICATE OF CORRECTION

| | | |
|---|---|---|
| PATENT NO. | : 7,950,889 B2 | Page 1 of 1 |
| APPLICATION NO. | : 12/478490 | |
| DATED | : May 31, 2011 | |
| INVENTOR(S) | : Bernhard Homner | |

It is certified that error appears in the above-identified patent and that said Letters Patent is hereby corrected as shown below:

Col. 1, line 18, after "or" delete "bums" and insert -- burns --.

Col. 2, line 15, after "it" delete "-locks" and insert -- locks --.

Col. 3, line 26, after "into" delete "apin-shaped" and insert -- a pin-shaped --.

Col. 4, line 50, after "or" delete "infection" and insert -- injection --.

Signed and Sealed this
Twentieth Day of December, 2011

David J. Kappos
*Director of the United States Patent and Trademark Office*